United States Patent [19]

Hahndorff

[11] 4,287,548

[45] Sep. 1, 1981

[54] SURGE VOLTAGE ARRESTER WITH REDUCED MINIMUM OPERATING SURGE VOLTAGE

[75] Inventor: Axel Hahndorff, Berlin, Fed. Rep. of Germany

[73] Assignee: Siemens Aktiengesellschaft, Berlin & Munich, Fed. Rep. of Germany

[21] Appl. No.: 58,459

[22] Filed: Jul. 18, 1979

[30] Foreign Application Priority Data

Aug. 3, 1978 [DE] Fed. Rep. of Germany ....... 2834088

[51] Int. Cl.³ ................................................ H02H 9/06

[52] U.S. Cl. .................................... 361/120; 361/129; 313/306; 313/308; 313/231.1

[58] Field of Search ............... 361/120, 129, 130, 117; 313/306, 308, 325, 214, 217, 201, 231.1, 283, 291, 307, 221, 244; 315/35

[56] References Cited

U.S. PATENT DOCUMENTS

| | | | |
|---|---|---|---|
| 1,860,210 | 5/1932 | Spanner et al. | 361/120 X |
| 2,491,854 | 12/1949 | Force | 313/291 X |
| 3,588,576 | 6/1971 | Kawiecki | 361/120 X |
| 3,959,696 | 5/1976 | Lange et al. | 361/120 |
| 3,979,646 | 9/1976 | Peche et al. | 313/306 X |
| 3,989,985 | 11/1976 | Lange et al. | 361/120 |
| 4,084,208 | 4/1978 | Bazarian et al. | 361/129 X |

*Primary Examiner*—Patrick R. Salce

*Attorney, Agent, or Firm*—Hill, Van Santen, Steadman, Chiara & Simpson

[57] ABSTRACT

A surge voltage arrester has a gas-filled housing in which main electrodes are disposed opposite one another, and supported by a tubular insulating member on whose interior side at least one ignition strip extends over a portion of the tube length. There is applied, on the exterior side of the insulating member at least one electrically conductive layer, clamp, or electrode, which at least partially overlaps, from the exterior, the ignition strip. The arrester has a low impulse breakdown voltage, so that the difference between the impulse breakdown voltage and the DC breakdown voltage is substantially reduced.

12 Claims, 9 Drawing Figures

FIG 1
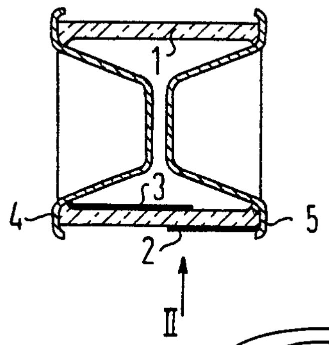
FIG 2
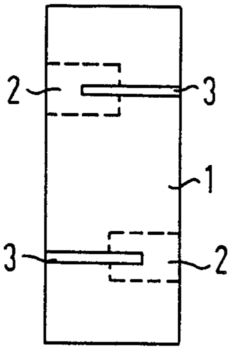
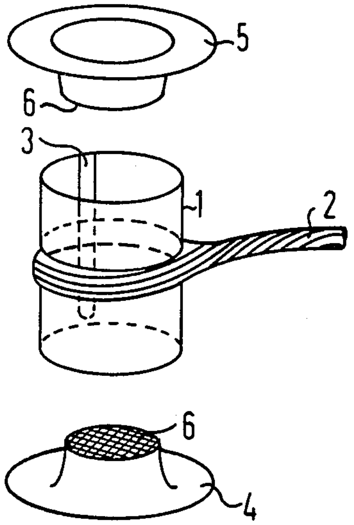
FIG3

SURGE VOLTAGE ARRESTER WITH REDUCED MINIMUM OPERATING SURGE VOLTAGE

BACKGROUND

1. Field of the Invention

The invention relates to a gas discharge tube, in particular, a surge voltage arrester, having a gas-filled housing in which main electrodes are disposed opposite one another, supported in a gas-tight fashion by the ends of a tubular insulating member. At least one strip of electrically conductive material, as an ignition strip, extends over a portion of the length of the interior of the tubular insulating member.

2. The Prior Art

Surge voltage arresters, of this general type are known and described, for example, in the German AS No. 2,207,009 or the German AS No. 2,346,174.

The ignition voltage of surge voltage arresters should be as independent as possible upon the rate of voltage rise dV/dt. In known surge arresters, this is to some extent the case, up to approximately $10^6$ V/sec. In the case of high voltage rise speeds; i.e., above $10^8$ V/sec., however, one finds markedly higher ignition voltages, such voltages being referred to in the following as the impulse breakdown voltage.

The impulse breakdown voltage can be significantly reduced by the use of radioactive materials; for example, tritium, added to the gas or by using ignition strips or electrically conductive coatings on the interior walls of the insulating member of the surge voltage arresters. It is necessary to maintain a distance of at least 1 mm, however, between the trigger line and one of the main electrodes, to maintain insulating values above $10^{10}$ ohms between the main electrodes.

The length of this insulating distance markedly influences the impulse breakdown voltage in such a manner that the arresters with the shortest insulating distances (and therefore the highest field intensity at the tip of the ignition strip) are the most rapid with the lowest impulse breakdown voltage. However, it is difficult to establish a small distance precisely, since, particularly in the case of insulating tubular members formed of glass, the main electrodes are pushed into the softened glass against the ignition strip tip in a somewhat variable manner. This leads to a considerable variation in the surge voltage arrester characteristic values.

BRIEF SUMMARY OF THE PRESENT INVENTION

The object of the present invention consists in producing a surge voltage arrester, wherein the difference between the impulse breakdown voltage and the DC breakdown voltage, and, also the variation in the impulse breakdown voltages are substantially reduced. In order to solve this problem, the invention provides, in one embodiment, that there be applied on the exterior side of the insulating member at least one electrically conductive layer, clamp, or electrode which at least partially overlaps, from the exterior, the ignition strip on the interior wall, or other conductive interior wall coating.

The tube of the present invention has the advantage that the effect of the ignition strip is increased by applying the electrically conductive layer to the exterior of the insulating member so that the ignition strip on the inside is overlapped by the exterior conductive layer. Preferably, the negative pole is connected to the main electrode which is electrically conductively connected with the ignition strip, and the positive pole is connected to the main electrode which is electrically conductively connected with the exterior conductive layer.

Preferably, the exterior electrically conductive layer and the ignition strip are brought toward one another to such an extent and separated by the wall of the insulating member so that the shortest distance through the insulating member between the layer and the strip is smaller than $\epsilon$-times the shortest distance between two main electrodes through the gas space, where $\epsilon$ is the dielectric constant of the insulating member.

The advantage thus achieved is an increase in the field intensity in comparison with other surge arresters. This is because the field intensity is established by the relatively thin wall thickness of the insulating member, and the greater dielectric constant of the glass or ceramic insulating member in relation to gas.

The greatest effect is obtained if the electrically conductive layer overlaps the ignition strip by a distance equal to at least double the wall thickness, and when the ignition strip is negatively polarized.

It is known in the art that conductive interior wall coatings, which are formed in the case of some types of gas discharge tubes subsequent to their closure during manufacture, either during testing or during an operation of metal vaporization or cathode sputtering, likewise reduce the impulse breakdown voltage. According to an advantageous embodiment of the invention, it is therefore provided that the exterior electrode be applied in such a manner that a conductive interior wall coating or a dark ring is later formed therebelow.

Arresters produced in accordance with the present invention are quite different from known triggerable arresters which have an exterior electrode but which contain no ignition strip and which are ignited by a high-frequency AC voltage, so that the ignition voltage is vastly variable and limited by the lowest triggerable DC voltage and the DC breakdown voltage without trigger pulse.

The present invention solves the problem of how to reduce only the impulse breakdown voltage, and keeping the DC breakdown voltage constant, thus reducing the difference between the two without altering the ignition voltage for slow voltage rises. Also, the known triggerable gas discharge tubes require high frequency electric alternating fields, which are not needed for operation of arresters embodying the present invention.

The exterior electrode can be produced by means of brushing-on, pressing-on, or spraying-on of Hydrokollag, conductive silver paint, soot color, or burnish platinum and subsequent firing. It can also be produced by means of vapor-deposition, sputtering-on, rubbing-on, or sintering-on of metals or other conductive materials. Clamping rings, clamps, conductive adhesive strips, flexible or elastic conductive plastics, electrode screens, electrode caps, coatings reinforced by electroplating, as well as arrester frames or mountings which tightly enclose the insulating member, or having any gap separating it from the surface of the insulating member filled in with conductive or dielectric material, are also suitable.

In this manner, one obtains, in the case of 230 V surge arresters, for example, impulse breakdown voltages of below 500 V for $10^9$ V/sec., with good inter-electrode insulation and with a remarkably low variation of the impulse breakdown voltage of the individual units. Particularly in the case of large piece numbers, one observes fewer runaways and hence an improved approximation of the impulse breakdown voltage to a normal distribution.

It is believed that the physical effect underlying the superior results of the present invention results because the electric field between two poles, given a voltage which is kept constant, is attenuated in an insulating plate introduced transversely to the field direction, and is intensified in the air gap, whereby, on the insulating-surface, the field intensity in the air gap amounts to $\epsilon$-times the field intensity in the insulator, and the line integral of the electric field intensity from pole-to-pole is equal to the applied voltage. The electric field intensity can thereby be increased at the location of an ignition strip without shortening the gas discharge distance, by employing a thin-walled insulating member, or a member with a relatively high dielectric constant $\epsilon$, or both.

BRIEF DESCRIPTION OF THE DRAWINGS

Reference will now be made to the accompanying drawings, in which:

FIG. 1 illustrates a longitudinal view of a surge voltage arrester incorporating the present invention;

FIG. 2 illustrates a developed view of the insulating member shown in FIG. 1;

FIG. 3 illustrates an exploded view of an additional surge voltage arrester according to the invention.

DESCRIPTION OF THE PREFERRED EMBODIMENTS

Figure 4:
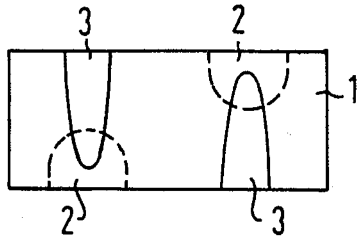
FIGS. 4 through 9 illustrate additional developed views of alternative arrangements of the insulating member shown in FIG. 1.

The gas-filled surge voltage arrester illustrated in FIG. 1 manifests two main electrodes 4 and 5, which are supported in a gas-tight fashion by the ends of the tubular insulating member 1. A noble (or inert) gas is preferably utilized as the gas filling the interior of the surge voltage arrester. On the interior side of the insulating member 1, there is at least one strip 3 of electrically conductive material, formed, for example, of graphite. The strip 3, which is sometimes referred to as an ignition strip, extends over a portion of the length of the insulating member 1 from the one main electrode 4 toward the other main electrode 5. On the exterior side of the insulating member, at least one electrically conductive layer 2 is applied, which partially overlaps the ignition strip 3. In FIG. 2, an overlapping of this type of two ignition strips 3, applied internally on the insulating member 1, and two electrically conductive layers 2, applied externally on the insulating member 1, is illustrated. The ignition strips 3 are electrically connected individually to one of the main electrodes 4 or 5, and the conductive layers 2 are each connected to the opposite electrode.

FIG. 3 illustrates a surge voltage arrester with an external electrode, or clamp, as the electrically conductive layer 2. The two main electrodes 4 and 5 are provided on their active surfaces with a honeycomb structure in which an electrode-activation layer, of material having a high thermal electron emission capability, can be secured. In this embodiment, the ignition strip extends from the main electrode 5, toward the main electrode 4, and is overlapped, in the region between the two main electrodes 4 and 5, by the electrically conductive layer 2, which, in the sample embodiment, is designed in the form of a copper litz conductor.

Figure 5:
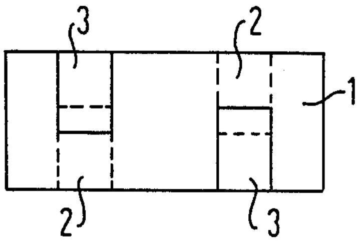
Figure 6:
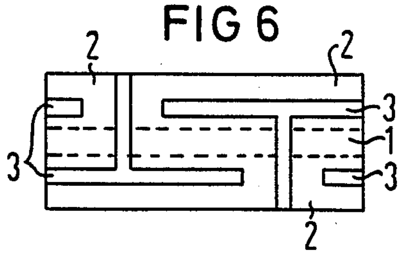
Figure 7:
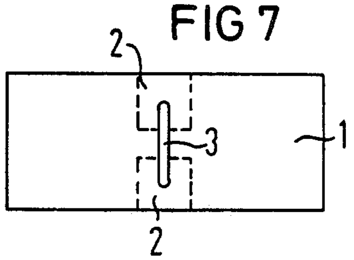

FIGS. 4 through 9 illustrate additional arrangements of ignition strips 3, applied internally on the insulating member 1, and electrically conductive layers 2 applied externally. In FIG. 4, the ignition strips are tapered in the overlapping region, and the electrically conductive coatings 2 are rounded off. In FIG. 5, the ignition strips 3 and the coatings 2 have the same width in the overlapping region. In FIG. 6, the ignition strips 3 have a T-shaped construction. FIG. 7 illustrates a center ignition strip 3, which is overlapped at both ends by the electrically conductive coatings 2 connected to the main electrodes.

Figure 8:
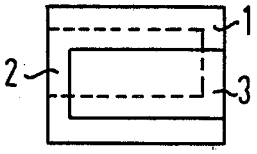
Figure 9:
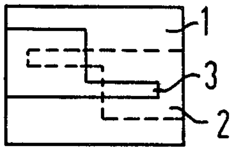

FIGS. 8 and 9 illustrate two further embodiments of the overlapping regions of an ignition strip 3, proceeding from the one main electrode, and an electrically conductive layer 2, proceeding from the other main electrode, which are applied internally, and externally, respectively, on the insulating member 1. In FIGS. 8 and 9, the left and right side edges are the edges engaged by the main electrodes, while in FIGS. 2 and 4–7, the upper and lower edges are the ones so engaged.

It will be clear to those skilled in the art that various modifications can be made without departing from the essential features of novelty of the present invention, which are intended to be defined and secured by the appended claims.

What is claimed is:

1. A surge voltage arrester, comprising a gas-filled housing incorporating two main electrodes disposed opposite one another, said electrodes being supported in a gastight fashion by the ends of a tubular insulating member, at least one coating of electrically conductive material extending over a portion of the interior length of said insulating member, at least one electrically conductive surface on the exterior of said insulating member which at least partially overlaps said coating, and means adapted to establish an electric field between said coating and said surface.

2. The surge voltage arrester according to claim 1, wherein said coating is electrically connected to a main electrode.

3. The surge voltage arrester according to claim 1, wherein said electrically conductive surface is electrically connected to a main electrode.

4. The surge voltage arrester according to claim 1, wherein said electrically conductive surface comprises a conductive layer applied to said insulating member.

5. The surge voltage arrester according to claim 1, wherein said electrically conductive surface comprises the surface of a conductive member located exteriorally of said insulating member.

6. The surge voltage arrester according to claim 1, wherein said coating of electrically conductive material is in the shape of a strip.

7. The surge voltage arrester according to claim 1, wherein said coating of electrically conductive material is formed on the interior of said insulating member after said gas-filled housing has been closed.

8. The surge voltage arrester according to claim 1, wherein said electrically conductive surface and said coating are separated by the wall of said insulating member such that the shortest distance through the insulating member is less than $\epsilon$-times the shortest distance between the two main electrodes through the gas volume.

9. The surge voltage arrester according to claim 1, wherein the overlapping areas of said electrically conductive coating and said electrically conductive surface have a dimension equal to at least twice the thickness of said insulating member.

10. The surge voltage arrester according to claim 9, wherein said overlapping dimension is in the direction parallel to the axial dimension of said tubular insulating member.

11. The surge voltage arrester according to claim 1, wherein said coating is connected to the one of said main electrodes which is more negative in electrical potential than the other main electrode.

12. The method of operating a surge voltage arrester having a pair of main electrodes supported at opposite ends of a tubular insulating member, said tubular insulating member having an electrically conducting coating extending along a portion of the length of said insulating member on the interior thereof, and an electrically conductive surface juxtaposed with the exterior of said insulating member and at least partially overlapping said coating, comprising the steps of; connecting said coating to the main electrode which is the more negative in electrical potential, and connecting said surface with the other main electrode.

* * * * *